United States Patent [19]

Ruiz

[11] Patent Number: 5,288,472
[45] Date of Patent: Feb. 22, 1994

[54] PROCESS FOR THE RECOVERY OF THE SODIUM HYDROXIDE AND SODIUM CHLORIDE FROM THE EFFLUENT OF A DIAPHRAGM CELL AS SOLID SODIUM BICARBONATE

[76] Inventor: Raymundo L. Ruiz, Sierra Vista-Residencia 350, Colonia Linda Vista, Mexico 14, D.F., Mexico

[21] Appl. No.: 14,621

[22] Filed: Feb. 8, 1993

[51] Int. Cl.$^5$ .............................................. C01D 1/30
[52] U.S. Cl. ..................... 423/187; 423/189; 423/190; 423/422; 423/423; 204/98
[58] Field of Search ............... 423/187, 189, 190, 422, 423/423; 204/98, 128

[56] References Cited

U.S. PATENT DOCUMENTS

| | | | |
|---|---|---|---|
| 1,416,772 | 3/1922 | Bacon | 423/471 |
| 1,491,672 | 4/1924 | Claude | 423/471 |
| 2,005,868 | 6/1935 | MacMullin | 423/427 |
| 2,383,674 | 8/1945 | Osborn et al. | 423/422 |
| 2,671,713 | 3/1954 | Miller et al. | 23/65 |
| 2,792,283 | 5/1957 | Hill et al. | 423/422 |
| 3,014,782 | 12/1961 | Arita et al. | 423/471 |
| 3,103,413 | 9/1963 | Blumenthal et al. | 423/421 |
| 3,202,477 | 8/1965 | Loeffler, Jr. et al. | 423/421 |
| 3,449,067 | 6/1967 | Schmitt et al. | 423/424 |
| 3,653,819 | 4/1972 | Shibata et al. | 423/189 |
| 3,868,444 | 2/1975 | Frevel et al. | 423/422 |
| 3,975,503 | 8/1976 | Hauschild et al. | 423/421 |
| 4,032,616 | 6/1977 | Artur et al. | 423/190 |
| 4,061,718 | 12/1977 | Verlaeten et al. | 423/421 |
| 4,172,017 | 10/1979 | Abraham | 204/60 |
| 4,217,330 | 8/1980 | Nakaya et al. | 422/193 |
| 4,260,594 | 4/1981 | Verlaeten et al. | 423/421 |
| 4,283,372 | 8/1981 | Frint et al. | 423/206 T |
| 4,288,419 | 9/1981 | Copenhafer et al. | 423/422 |
| 4,320,106 | 3/1982 | Hentschel et al. | 423/424 |
| 4,337,234 | 6/1982 | Hentschel et al. | 423/424 |
| 4,563,340 | 1/1986 | Polendo-Loredo | 423/186 |
| 4,652,437 | 3/1987 | Nakaya et al. | 423/421 |
| 4,654,204 | 3/1987 | Copenhafer et al. | 423/190 |

FOREIGN PATENT DOCUMENTS

| | | | |
|---|---|---|---|
| 0521758 | 2/1956 | Canada | 423/424 |
| 0688540 | 6/1964 | Canada | 423/424 |
| 5826028 | 8/1981 | Japan | 423/421 |
| 0462132 | 3/1937 | United Kingdom | 423/424 |

OTHER PUBLICATIONS

Te-Pang Hou, Ph.D.; American Chemical Society Monograph Series; "Manufacture of Soda With Special Reference to the Ammonia Process"; pp. 253-254 & 263-264, 1942.

Primary Examiner—Kathryn Gorgos
Attorney, Agent, or Firm—Knobbe Martens Olson & Bear

[57] ABSTRACT

The present invention relates to a method and process for recovering solid sodium bicarbonate, from the effluent, of the cathode compartment of a diaphragm cell that contains sodium hydroxide and sodium chloride. The effluent is treated with carbon dioxide and ammonia to essentially convert the sodium hydroxide to sodium bicarbonate. Thereafter, the effluent is treated to decompose the ammonium chloride to evolve and recycle ammonia without the formation of pollutants, the treated effluent, free of $NH_3$, $CO_2$ and alkali, is resaturated and sent to the anode compartment of the diaphragm cell. In preferred embodiments, all of the steps are interconnected and the materials produced are recycled, such that the only products produced are chlorine, hydrogen and sodium bicarbonate, without waste products in a continuous process.

21 Claims, 1 Drawing Sheet

PROCESS FOR THE RECOVERY OF THE SODIUM HYDROXIDE AND SODIUM CHLORIDE FROM THE EFFLUENT OF A DIAPHRAGM CELL AS SOLID SODIUM BICARBONATE

FIELD OF THE INVENTION

The present invention relates generally to the field of carbonation processes; more specifically, it relates to a system and method for the recovery of solid sodium bicarbonate from the effluent of a diaphragm cell containing sodium hydroxide and sodium chloride.

BACKGROUND OF THE INVENTION

Chlorine is commonly produced through electrolytic decomposition of sodium chloride in an electrolytic cell. An equivalent amount of sodium hydroxide and chlorine is produced in this decomposition. World-wide demand for chlorine has been increasing rapidly. However, as a consequence of satisfying this demand for chlorine, an increasing amount of sodium hydroxide is also produced that exceeds its market demand. Consequently, it would be highly desirable to convert excess sodium hydroxide into products for which a higher demand exists.

Traditionally, there has been little economic incentive for conversion of the sodium hydroxide because the cost of $Na_2O$ as sodium hydroxide was much more expensive than $Na_2O$ as other products, such as sodium carbonate. However, the acute disposal problems presented by the excess of sodium hydroxide has effected the price relationship between these commodities, and the price of $Na_2O$ in sodium hydroxide has become relatively less expensive than the price of $Na_2O$ in sodium carbonate. This excess of concentrated, commercially available sodium hydroxide solutions, with concentrations as high as 50-70%, has placed a strong impetus on the art to modify its perception. As a result, various processes have arisen to carbonate concentrated NaOH solutions with carbon dioxide ($CO_2$), producing sodium carbonate monohydrate or anhydrous sodium carbonate. These processes, however, have not resulted in a commercially feasible conversion, despite the fact that some eliminate the need for further evaporation.

In the production of chlorine from sodium chloride, chlor-alkali electrolytic cells are often used. However, two different cell types may be used, each with differing results: the mercury cell and the diaphragm cell. The purity of the chlorine produced by either cell is the same. However, the mercury cell has the advantage of producing sodium hydroxide of a very high purity, unequaled by the product from the diaphragm cell. Further, the mercury cell produces highly concentrated solutions (50-70%). In contrast, only a dilute effluent is produced from the cathode compartment of the diaphragm cell, i.e., 100-120 g of sodium hydroxide and 140-170 g of sodium chloride per liter. This product must be evaporated to produce a marketable, concentrated 50-70% sodium hydroxide solution free of the sodium chloride.

The mercury cell is not without its flaws; there are serious economic constraints attendant to its production of chlorine. First, the installation costs of a mercury cell far exceed those of a diaphragm cell per ton of chlorine produced per day. Second, mercury cell are not very energy efficient, on the order of 50%, compared to the diaphragm cell's approximately 70% efficiency. Third, in order to achieve optimal operation of a mercury cell, the brine must be thoroughly purified to remove ions such as $Ca^{2+}$, $Mg^{2+}$ and $SO_4^{2-}$, adding still higher costs to the operation of a mercury cell. In view of the shortcomings of the mercury cell, it would be desirable to provide a process that can make use of the dilute sodium hydroxide effluent from a diaphragm cell.

PRIOR ART

In U.S. Pat. No. 552,955, a solution of sodium bicarbonate and gaseous $CO_2$ is provided to the cathode compartment of a diaphragm cell while a saturated sodium chloride solution is provided to the anode compartment. The sodium chloride is electrolytically decomposed, and passed to the cathode compartment where the hydroxide ions formed in the electrolysis are converted to sodium carbonate through mixing with the sodium bicarbonate/carbon dioxide solution. The resulting sodium carbonate solution is sent to a separate container where it is converted to sodium bicarbonate with more $CO_2$, precipitated and removed. The mother liquor is recycled to the cathode compartment.

The operation of this process, however, tends to lower the efficiency of the cell and the accumulated water must be evaporated.

In U.S. Pat. No. 2,383,674, the effluent from the cathode compartment of a diaphragm cell is sent through a sodium chloride bed to saturate it with sodium chloride. Thereafter, the solution is treated with carbon dioxide to recover much of the sodium hydroxide as sodium bicarbonate which precipitates and is removed by filtration. The alkali mother liquor is recycled to the anode section of the cell.

The recycling of the alkali mother liquor to the anode section is detrimental to the functioning of the cell; it lowers the current efficiency of the sodium hydroxide and chlorine produced. Further, anodes are consumed more quickly, and the chlorine produced is contaminated with carbon dioxide formed through the decomposition of the bicarbonate ions in the alkali mother liquor.

U.S. Pat. No. 3,868,444 disclosed a process for the preparation of hard, porous sodium bicarbonate granules through the reaction of ammonia bicarbonate and carbon dioxide with sodium hydroxide and sodium chloride in an aqueous solution under pressure. The concentration of the sodium ions in the solution was greater than about 2.5 gram equivalents/liter and the bicarbonate ion concentrations were greater than about 0.04 gram equivalents/liter. During the reaction, the solution was agitated vigorously and the carbon dioxide was introduced to attain a partial pressure of 15-40 p.s.i.g., and the reaction was continued until the carbon dioxide absorption ceased. The sodium bicarbonate granules produced in the reaction had a surface area of greater than 0.5 meters/gram and greater than 20% porosity. Moreover, while the sodium bicarbonate produced could be used to abate air pollution in flue gases, i.e., absorption of $SO_2$, it was intermixed with sodium chloride so its purity was insufficient to produce sodium carbonate acceptable to the market. Furthermore, the mother liquor, after the sodium bicarbonate was filtered off, contained a high concentration of sodium chloride (approximately 5.0 gram ion equivalents) that could not be resaturated with sodium chloride and electrolytically decomposed because of the ammonium chloride content of the solution. Also, the soluble salts present in the mother liquor posed a disposal problem, if not recovered.

In U.S. Pat. No. 4,032,616, the effluent from the cathode compartment of a diaphragm cell is carbonated in three steps: (i) an amount of $CO_2$ necessary to convert the sodium hydroxide to sodium carbonate, (ii) introducing $CO_2$ to precipitate a portion of the sodium carbonate as sodium bicarbonate maintaining the temperature below 70° C.; and (iii) the suspension of sodium bicarbonate obtained from the second step is carbonated to completion with $CO_2$ and cooled to a temperature not over 45° C. The precipitated sodium bicarbonate is recovered by filtration. However, the filtered mother liquor which is saturated with sodium bicarbonate and approximately 140-170 grams per liter of sodium chloride is voided from the system.

While there is no evaporation in this process, the current efficiency of the cell in relation to the sodium bicarbonate recovered is less than 88.0%. The soluble salts present in the voided mother liquor, if not recovered, increases the cost of operation and would create disposal problems.

Accordingly, a need remains in the art for an improved method and process to recover sodium bicarbonate from chlor-alkaline electrolytic cells and to increase the efficiency of the existing chlorine producing processes.

SUMMARY OF THE INVENTION

Figure 1:
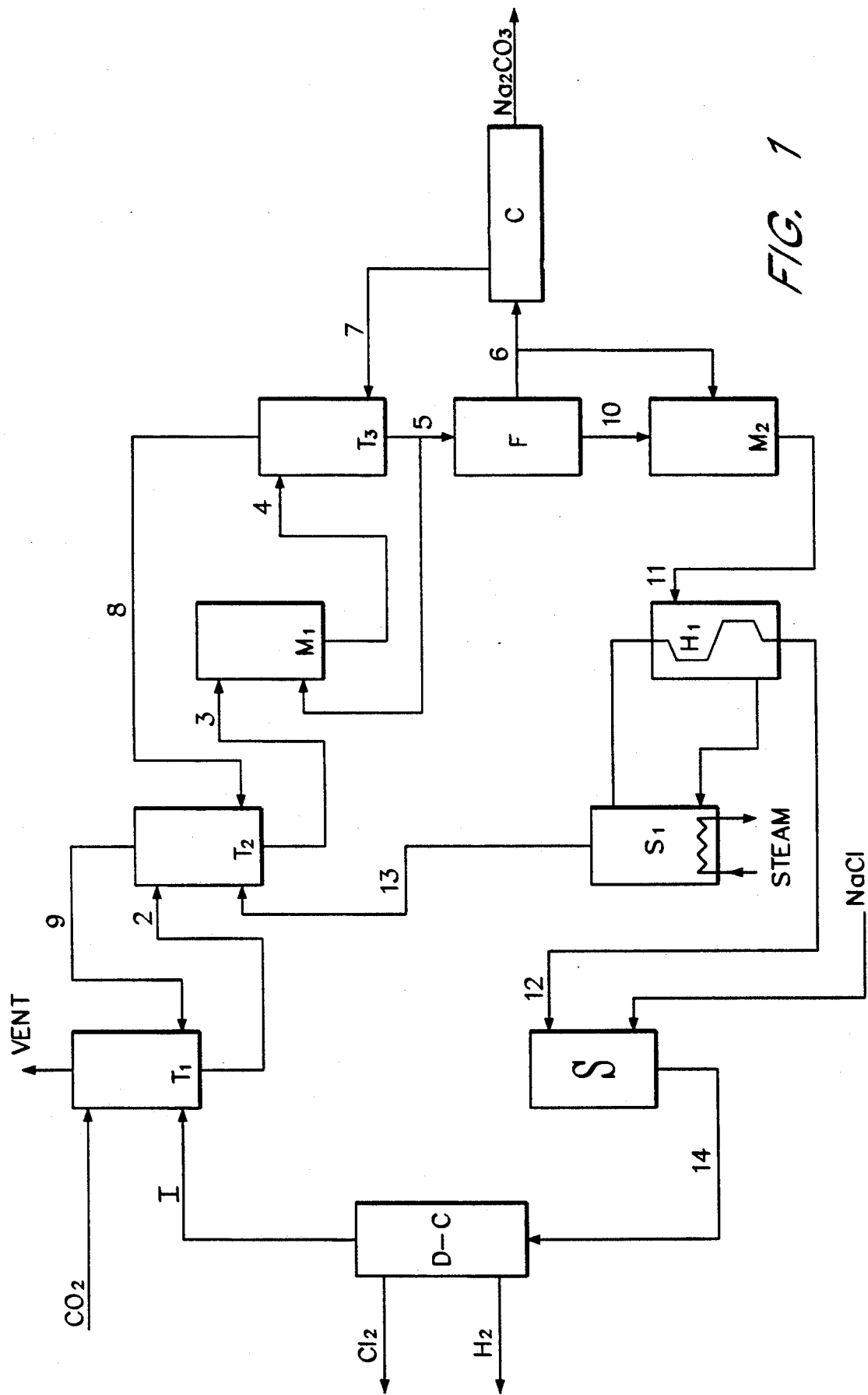
FIG. 1 is a schematic flow diagram that illustrates a preferred method of the present invention, in which sodium hydroxide and sodium chloride in the effluent of a chlor-alkali diaphragm cell is virtually totally recovered as solid sodium bicarbonate.

In accordance with one aspect of the present invention, there is provided a three stage carbonation process of the effluent of a chlor-alkali diaphragm cell. The effluent preferably contains approximately 120 g/l of sodium hydroxide and approximately 140 g/l of sodium chloride. In a preferred embodiment, ammonia is used to fully recover the sodium hydroxide content of the effluent as solid sodium bicarbonate. Accordingly, in the first stage of this aspect of the invention, the effluent of the cell is treated in a primary carbonating tower with carbon dioxide to form 1.5 equivalents each of bicarbonate and hydroxide ions, keeping the temperature below 40° C. Then, in a second carbonating tower, the effluent is treated with concentrated carbon dioxide and ammonia gas to form a metastable super-saturated solution of sodium bicarbonate.

Preferably, the carbon dioxide and ammonia gases are prepared by decomposition of ammonia bicarbonate and ammonium chloride, for example in a stripping tower. Furthermore, during the carbonation reaction a reaction temperature below 30° C. is preferred.

The super-saturated metastable solution of sodium bicarbonate is brought in contact with solid sodium bicarbonate seed crystals in a first mixing tank to yield a suspension, wherein the sodium bicarbonate from the solution and that formed in the third carbonating step crystallizes on the seed crystals.

Thereafter, the suspension in the first mixing tank is treated with concentrated carbon dioxide in a third carbonating tower in a third and final carbonating step. Preferably, the concentrated carbon dioxide used in this carbonating tower is produced in a calciner. Due to the third carbonating step, the carbonation of ammonium hydroxide to ammonium bicarbonate, and sodium hydroxide to sodium bicarbonate is substantially complete. Preferably, the temperature in this third carbonating step is at a temperature below 40° C. The additional sodium bicarbonate produced in the third carbonating step crystallizes, and the super-saturation of sodium bicarbonate is relieved.

As will be appreciated, a double decomposition reaction between the sodium chloride in the effluent and the ammonium bicarbonate will occur to produce ammonium chloride and additional sodium bicarbonate, that will crystallize.

In a preferred embodiment, the vent gases of the third carbonating step are sent back to the second carbonating tower to avoid the loss of $CO_2$.

It is also preferred to use a part of the suspension containing solid sodium bicarbonate, which is produced in the third carbonating step as the solid sodium bicarbonate (or seed crystals), which is brought in contact with the effluent of the second carbonating tower in the first mixing tank.

After completing the third carbonating step, the suspension produced is sent to a filter to separate the solid sodium bicarbonate from the mother liquor in the filtering step.

It is preferred to calcine the solid, washed sodium bicarbonate from the filtering step to produce sodium carbonate and carbon dioxide, whereby the latter can be recycled as concentrated $CO_2$ for use in the third carbonating step.

After the filtering step, the mother liquor is brought into contact with sodium bicarbonate in a second mixing tank, which is preferably solid sodium bicarbonate recovered from the above filtering step. The suspension yielded in the second mixing tank is heated in a heat exchanger to evolve ammonia and carbon dioxide gas, and the gases are separated in a stripping tower. In a preferred embodiment of the present invention, the ammonia and $CO_2$ gases evolved are recycled to the second carbonating tower.

The effluent yielded from the stripping tower, which is substantially alkaline-free and stripped of ammonia and $CO_2$, is resaturated with sodium chloride in a saturator and cooled and recycled as a saturated sodium chloride solution to the anode compartment of the diaphragm cell. In a preferred embodiment of the present invention, the heat exchangers used above are countercurrent heat exchangers. Furthermore, it is preferred to heat the suspension in the stripping tower with steam to the boiling point of the solution. The carbonating towers used according to the present invention are preferably atmospheric carbonating towers.

When the above-described process is carried out as a continuous process, substantially all sodium from the sodium hydroxide and sodium chloride of the effluent of the diaphragm cell can be recovered as sodium bicarbonate or sodium carbonate. In a continuous process, also substantially all gases evolved and vented during the process are recovered and recycled.

In accordance with another aspect of the present invention, the effluent of a chlor-alkali diaphragm cell is carbonated in three stages. In this process, a preliminary carbonating step is utilized. Accordingly, in this process, the effluent of the diaphragm cell is treated with carbon dioxide to form a solution containing 50% sodium bicarbonate and 50% sodium hydroxide in the primary carbonating tower before treating the effluent with ammonia and carbon dioxide in the second carbonating tower. Preferably, the temperature of the effluent of the diaphragm cell during the treatment in the primary carbonating tower is kept below 40° C. It is preferred to use as carbon dioxide for the treatment of the effluent of the diaphragm cell a carbon dioxide which has 10–100% by volume. In a preferred embodiment of the invention, the gases vented from the second carbonating tower are sent or recycled to the primary carbonating tower.

The foregoing will become fully understood in light of the following detailed description with reference to the accompanying figures and claims.

DETAILED DESCRIPTION OF THE PREFERRED EMBODIMENTS

In accordance with the present invention, a three stage sodium bicarbonate recovery system and method are provided. The three-stage system is described below in detail.

First Stage

In an atmospheric carbonating tower (primary carbonating tower), 66 kg of carbon dioxide (10–100%) are absorbed per cubic meter of effluent from the diaphragm cell using the most economical source of carbon dioxide available. This takes into account the avidity of the sodium hydroxide for carbon dioxide and the higher cost of concentrated carbon dioxide ($CO_2$ concentrations greater than 10%). Preferably, the gases vented from the second carbonating tower in the second stage are also sent counter-current to the flow of the effluent of the diaphragm cell in the primary carbonating tower to avoid the loss of ammonia and carbon dioxide.

Preferably, approximately 50% of the sodium hydroxide is carbonated to sodium bicarbonate in this stage. The temperature at this stage is preferably kept below 40° C., ordinarily by cooling. At this stage, there will be no crystallization, thus, favoring the optimal efficiency of the heat exchangers.

Second Stage

The effluent of the primary stage is sent to a second atmospheric carbonating tower in which concentrated carbon dioxide and ammonia gas are sent counter-current to the effluent from the primary stage. Preferably, these gases are prepared by decomposition of ammonia bicarbonate and ammonium chloride in a stripping tower. The amount of recovered gases from the stripping tower per cubic meter of the effluent from the diaphragm cell are 17 kg of ammonia gas and 44 kg of carbon dioxide. Furthermore, it is preferred to send the vented gases from the carbonating tower in the third stage counter-current to the effluent from the second stage to avoid the loss of $CO_2$.

In this second stage, the ammonia and added carbon dioxide will form a solution containing 2.5 equivalents of bicarbonate ions and 1.5 equivalents of hydroxide ions. Preferably, in this stage, the temperature is kept below 30° C., preferably by cooling. A metastable super-saturated solution of sodium bicarbonate is formed which excludes crystal formation and therefore promotes a high efficiency in the heat exchangers.

Mixer

The effluent of the second stage is sent to a mixing tank, where, about 25.2 kg of solid sodium bicarbonate are added. This quantity of sodium bicarbonate represents about 10% of the sodium bicarbonate that will crystallize per cubic meter of the effluent from the diaphragm cell. Preferably, the solid sodium bicarbonate added as a slurry, is part of the slurry containing solid sodium bicarbonate produced in the third stage.

This solid sodium bicarbonate will act as seed crystals to the metastable super-saturated solution from the second stage and will relieve the super-saturation of the solution as the carbonation to ammonium bicarbonate and sodium bicarbonate proceeds in the carbonating tower of the third stage.

Third Stage

The suspension from the mixer is sent to the third atmospheric carbonating tower in which 66 kg of concentrated carbon dioxide, preferably from a calciner, is recycled per cubic meter of effluent from the diaphragm cell to complete the carbonation of the ammonium hydroxide to ammonia bicarbonate and the sodium hydroxide to sodium bicarbonate. Preferably, the temperature in the third stage is kept below 40° C.

In the above reactions, the ammonium in solution seems to act as a carbon dioxide carrier until all of the sodium hydroxide is transformed to sodium bicarbonate and the ammonia remains as ammonium bicarbonate which can be decomposed by simple heating.

The sodium ($Na+$) ions from the sodium chloride in the effluent of the diaphragm cell and the bicarbonate ($HCO_3-$) ions from the ammonium bicarbonate, after crystallization of the sodium bicarbonate, will form a saturated solution of less than 0.1 equivalents of sodium bicarbonate per liter. After the super-saturation is relieved, a double decomposition reaction occurs between the sodium chloride and the ammonia bicarbonate:

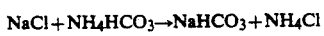

$$NaCl + NH_4HCO_3 \rightarrow NaHCO_3 + NH_4Cl$$

The sodium bicarbonate that is formed from this reaction and that crystallizes will leave an equivalent amount of ammonia in solution fixed as ammonium chloride. This double decomposition reaction is allowed to proceed until there is an excess of equivalency of ammonium chloride to sodium bicarbonate in the solution. At this point, the suspension of sodium bicarbonate is separated from the saturated mother liquor. Preferably, the temperature at this stage is kept below 40° C.

The slurry of sodium bicarbonate from the third carbonating tower is divided. Part of it is recycled to the mixing tank to act as seed crystals as mentioned above and the rest is sent to a filter where the sodium bicarbonate is separated and washed.

Calciner

The solid, washed sodium bicarbonate from the filter (252 kg) is calcined to 159 kg of sodium carbonate (soda-ash) and 66 kg of carbon dioxide. This yield is recovered per cubic meter of the treated effluent from the diaphragm cell.

In a preferred embodiment of the present invention, this concentrated carbon dioxide produced in the calcining step is recycled to the atmospheric carbonating tower in the third stage.

Recovery of Ammonia and Carbon Dioxide

Part of the solid sodium bicarbonate from the filter is added to the filtered mother liquor to recover the ammonia fixed as ammonium chloride in solution. The amount of solid sodium bicarbonate returned to the filtered mother liquor is equivalent to the difference between the ammonium chloride and sodium bicarbonate in solution in the mother liquor.

The suspension of solid sodium bicarbonate in the filtered mother liquor is heated in counter-current heat exchangers and sent to a stripping tower where it is heated preferably with steam to the boiling point to decompose the ammonia in the ammonium bicarbonate, and the ammonium chloride as seen in the formulae below:

$$NH_4HCO_3 \xrightarrow[heat]{\Delta} NH_3 + H_2O + CO_2$$

$$NH_4Cl + NaHCO_3 \xrightarrow[heat]{\Delta} NaCl + NH_3 + H_2O + CO_2$$

In a preferred embodiment of the present invention, the ammonia and $CO_2$ gases evolved are recycled to the second atmospheric carbonating tower (17 kg of ammonia and 44 kg of $CO_2$ per cubic meter of treated effluent of the diaphragm cell).

The effluent from the stripping tower is preferably substantially free of ammonia and carbon dioxide. It is also, preferably, substantially free of alkalinity. Then, the effluent is sent to a saturating tank where about 175.5 kg of solid sodium chloride are dissolved and water is added to restore its volume. Thereafter, the resaturated brine is cooled and recycled to the anode compartment of the diaphragm cell, to produce about 106.5 kg of chlorine and about 120 kg sodium hydroxide.

The process of the present invention compared with known processes provides the advantage of the total conversion and recovery of the sodium hydroxide and the sodium chloride from the effluent of a chlor-alkali diaphragm cell as solid sodium bicarbonate. According to the present process there is no necessity of concentrating the dilute effluent from the diaphragm cell via evaporation to a 50-70% sodium hydroxide solution sold in the market as a concentrated solution. Therefore in the overall process, production costs can be significantly lowered.

The efficient use of sodium chloride and the high energy efficiency in converting it to sodium hydroxide by recycling substantially alkaline free presaturated treated effluent to the anode compartment of the diaphragm cell lowers the production cost further. Additionally, the use of the least expensive carbon dioxide available in the carbonation of the primary stage in the first carbonating tower, and the recovery and recycling of the ammonia fixed as ammonium chloride by the use of sodium bicarbonate provides further important factors to reduce the overall production costs.

Finally, the cooling of the thermal load of the exothermic process in the carbonating atmospheric towers can be carried out without difficulties. Moreover, in accordance with a preferred embodiment, no crystallization takes place that would adversely effect the operation of the heat exchangers in the first and second carbonating towers.

As a further important aspect of the present invention, it should be noted that the present process optimizes the energy consumption for the production of sodium bicarbonate combined with the production of chlorine from sodium chloride. The inventive process also avoids the use of mercury cells with its higher costs of operation and all of the problems associated with pollution of the environment with mercury. Furthermore, the process drastically reduces the release or the need to dispose of pollutants, since substantially all of the products are recovered or recycled.

Referring now to FIG. 1 there is provided a schematic flow diagram that illustrates the method of the present invention, in which the sodium hydroxide and the sodium chloride in the effluent of a chlor-alkali diaphragm cell is totally recovered as solid sodium bicarbonate by the use of carbon dioxide and ammonia. The substantially alkaline-free, treated effluent devoid of ammonia and carbon dioxide which is recovered and recycled to the process and is resaturated with sodium chloride and then returned to the anode compartment of the diaphragm cell in a continuous process.

For a more complete understanding and appreciation of the advantages of the invention the following example is given, which should serve as an illustration of one preferred embodiment of the claimed invention and which should not be taken as a limitation of the scope of the invention.

EXAMPLE

A cubic meter of the effluent 1 from the cathode compartment of a diaphragm cell D-C containing approximately 120 kg of sodium hydroxide and 140 kg of sodium chloride is sent to an atmospheric carbonating tower $T_1$ (primary carbonating tower), where about 66 kg of carbon dioxide and vent gases 9 from a atmospheric carbonating tower $T_2$ (second carbonating tower) are circulated counter-current to a sodium hydroxide solution 1 forming 50% sodium bicarbonate and 50% sodium hydroxide. The temperature in this step is kept below 40° C. by cooling.

An effluent 2 from the atmospheric carbonating tower $T_1$ is sent to a second atmospheric carbonating tower $T_2$, where the gases 13 from a stripping tower $S_1$ containing about 17 kg of ammonia and about 44 kg of carbon dioxide per cubic meter of effluent from the diaphragm cell and the vent gas 8 from the atmospheric carbonating tower $T_3$ (third carbonating tower) are sent counter-current to the flow of the solution 2 in the atmospheric carbonating tower $T_2$, forming ammonium hydroxide and partially carbonating the ammonium hydroxide to ammonium bicarbonate and the sodium hydroxide to sodium bicarbonate. The temperature in this step is kept below 30° C. by cooling.

The effluent 3 from the atmospheric carbonating tower $T_2$, is a metastable super-saturated solution of sodium bicarbonate, and is sent to a mixing tank $M_1$, where it is mixed with about 25.2 kg of solid sodium bicarbonate from the slurry 5 of the atmospheric carbonating tower $T_3$. The suspension 4 of the mixing tank $M_1$ is sent to the carbonating atmospheric tower $T_3$, where about 66 kg of carbon dioxide 7 from a calciner C is sent to the atmospheric carbonating tower $T_3$ in a counter-current fashion to the sodium bicarbonate suspension 4 which is carbonated to ammonium bicarbonate and sodium bicarbonate. The sodium bicarbonate crystallizes from the super-saturated solution on the sodium bicarbonate crystals 5 that are introduced in the mixing tank $M_1$ to act as seed crystals.

When the super-saturation of the sodium bicarbonate in solution is relieved by crystallization, the sodium chloride and ammonium bicarbonate in the solution react in a double decomposition reaction to form sodium bicarbonate and ammonium chloride. This reaction is allowed to proceed until the sodium bicarbonate produced in this double decomposition reaction crystallizes and the ammonium chloride formed exceeds the sodium bicarbonate in solution. In this step, the temperature is kept below 40° C.

Part of the slurry of sodium bicarbonate in the effluent 5 of the atmospheric carbonating tower $T_3$ is sent to the mixing tank $M_1$ to be used as seed crystals as mentioned above and the rest of the slurry (about 252 kg of sodium bicarbonate in suspension) 5 is sent to a filter F. The filtered and washed sodium bicarbonate 6 is sent to the calciner C, giving about 159 kg of sodium carbonate (Soda-Ash) and about 66 kg of carbon dioxide 7 which is sent to the atmospheric carbonating tower $T_3$.

The filtered mother liquor 10 is sent to a mixing tank $M_2$ where, filtered and washed sodium bicarbonate 6 is added in an equivalent amount to the difference of ammonium chloride to sodium bicarbonate in the filtered mother liquor 10 forming a suspension 11 and the suspension is heated in counter-current heat exchangers $H_1$ and then sent to the stripping tower $S_1$. In the stripping tower $S_1$, the suspension is heated with steam to its boiling point, giving about 17 kg of ammonia and about 44 kg carbon dioxide 13 per cubic meter of treated effluent from the diaphragm cell, these gases are sent to the atmospheric carbonating tower $T_2$.

The substantially alkaline free mother liquor 12 stripped of ammonia and carbon dioxide is sent to a saturator $S_1$ where it is resaturated with about 175.5 kg of sodium chloride and its volume is adjusted to the volume of the previous cycle. Finally, this solution is sent 14 to the anode section of the diaphragm cell D-C where the sodium chloride is decomposed electrolytically to form about 106.5 kg of chlorine and about 120 kg of sodium hydroxide.

I claim:

1. A method for converting sodium chloride and sodium hydroxide in an effluent stream from a chlor-alkali diaphragm cell, said chlor-alkali diaphragm cell having an anode compartment and a cathode compartment, to sodium bicarbonate, comprising the steps of:
   (a) treating the effluent of the diaphragm cell which contains unreacted sodium chloride with carbon dioxide to form a solution containing equivalent amounts of bicarbonate and hydroxide ions;
   (b) treating the solution from step (a) with ammonia and carbon dioxide to form a solution containing more equivalents of bicarbonate ions than of hydroxide ions;
   (c) mixing the solution of step (b) with solid sodium bicarbonate causing a substantial portion of the sodium bicarbonate produced in step (b) to crystallize from solution to form a first suspension;
   (d) treating the first suspension of step (c) with carbon dioxide to produce a second suspension containing the crystallized sodium bicarbonate of step (c) and additional crystallized sodium bicarbonate;
   (e) reacting the sodium chloride from the diaphragm cell effluent that is contained in the second suspension of step (d) in a double decomposition reaction with ammonium bicarbonate formed in steps (b) and (d) to give ammonium chloride and additional sodium bicarbonate that crystallizes;
   (f) separating the solid sodium bicarbonate from the suspension of step (e) to produce a mother liquor comprising saturated sodium bicarbonate with ammonium chloride in solution;
   (g) adding sodium bicarbonate to the mother liquor of step (f) to form a suspension;
   (h) heating the suspension of step (g) to evolve ammonia gas and carbon dioxide gas, and removing the ammonia and carbon dioxide gases, thereby producing an aqueous solution; and
   (i) cooling the aqueous solution of step (h), resaturating the aqueous solution with sodium chloride and recycling the aqueous solution as a sodium chloride solution to the anode compartment of the diaphragm cell.

2. The method according to claim 1, wherein the temperature of the effluent in step (a) is kept below 40° C.

3. The method according to claim 1, wherein the carbon dioxide used in step (a) has a concentration of 10–100% by volume.

4. The method according to claim 1, wherein the ammonia and carbon dioxide used in step (b) comprise the gases evolved in step (g).

5. The method according to claim 1, wherein the ammonia used in step (b) is less than 1.5% by weight of the effluent from the diaphragm cell.

6. The method according to claim 1, wherein the temperature of the solution in step (b) is kept below 30° C.

7. The method according to claim 1, wherein the solid sodium bicarbonate added in step (c) is taken from the solid sodium bicarbonate separated in step (f).

8. The method according to claim 1, wherein the temperature of the suspension in step (d) is kept below 40° C.

9. The method according to claim 1, wherein the carbon dioxide used in step (d) is produced by calcining sodium bicarbonate to sodium carbonate.

10. The method according to claim 1, wherein in step (e), the double decomposition reaction is allowed to proceed until the concentration of ammonium chloride in solution is higher than that of sodium bicarbonate.

11. The method according to claim 1, wherein in step (g), sodium bicarbonate yielded in step (f) is added in an amount equivalent to the difference of equivalency of the ammonium chloride contained in the mother liquor of step (f) minus the equivalency of the sodium bicarbonate contained in the mother liquor of step (f).

12. The method according to claim 1, wherein the mother liquor of step (f) is filtered before adding the sodium bicarbonate.

13. The method according to claim 1, wherein the sodium bicarbonate separated in step (f) is calcined to give carbon dioxide gas and sodium carbonate.

14. The method according to claim 13, wherein the carbon dioxide gas produced in step (h) is recycled to step (d).

15. The method according to claim 1, wherein step (h) comprises:
   heating the suspension to the boiling point in one or more heat exchangers; and
   sending the heated suspension to a stripping tower; and further heating the suspension.

16. The method according to claim 15, wherein the heat exchangers used are counter-current heat exchangers.

17. The method according to claim 16, wherein heating is carried out with steam to the boiling point of the suspension.

18. The method according to claim 1, wherein in step (i), the aqueous solution of step (h) is cooled.

19. The method according to claim 18, wherein the cooled aqueous solution is alkaline-free and free of ammonia and carbon dioxide.

20. The method according to claim 19, wherein step (i) comprises restoring the volume of the aqueous solution to the volume the solution had prior to entering the diaphragm cell.

21. The method according to claim 1, wherein the process is carried out as a continuous process.

* * * * *